Jan. 31, 1961  I. S. HIRSCHHORN  2,969,669
ABRASION TESTING APPARATUS
Filed May 10, 1955  2 Sheets-Sheet 1
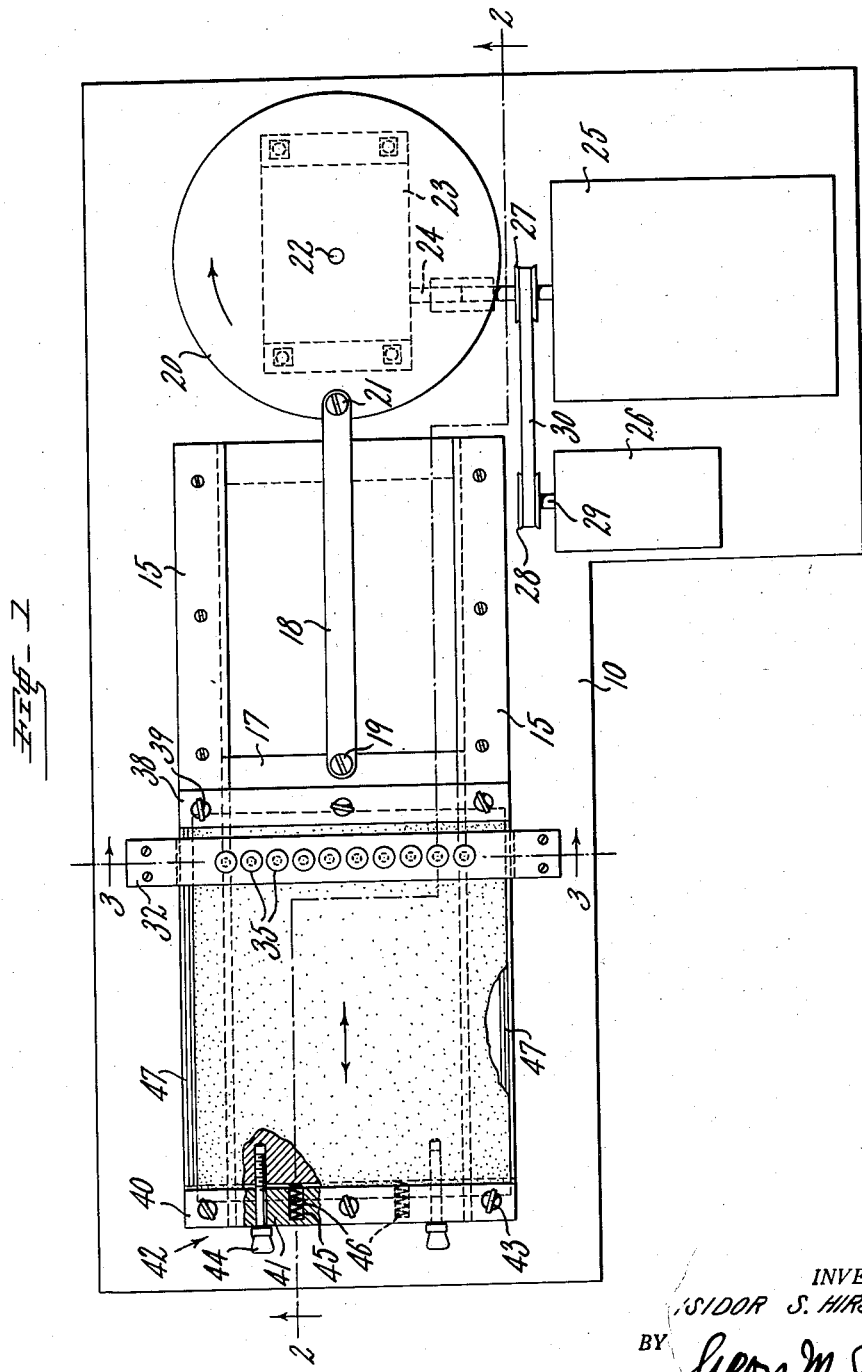
INVENTOR.
ISIDOR S. HIRSCHHORN
BY

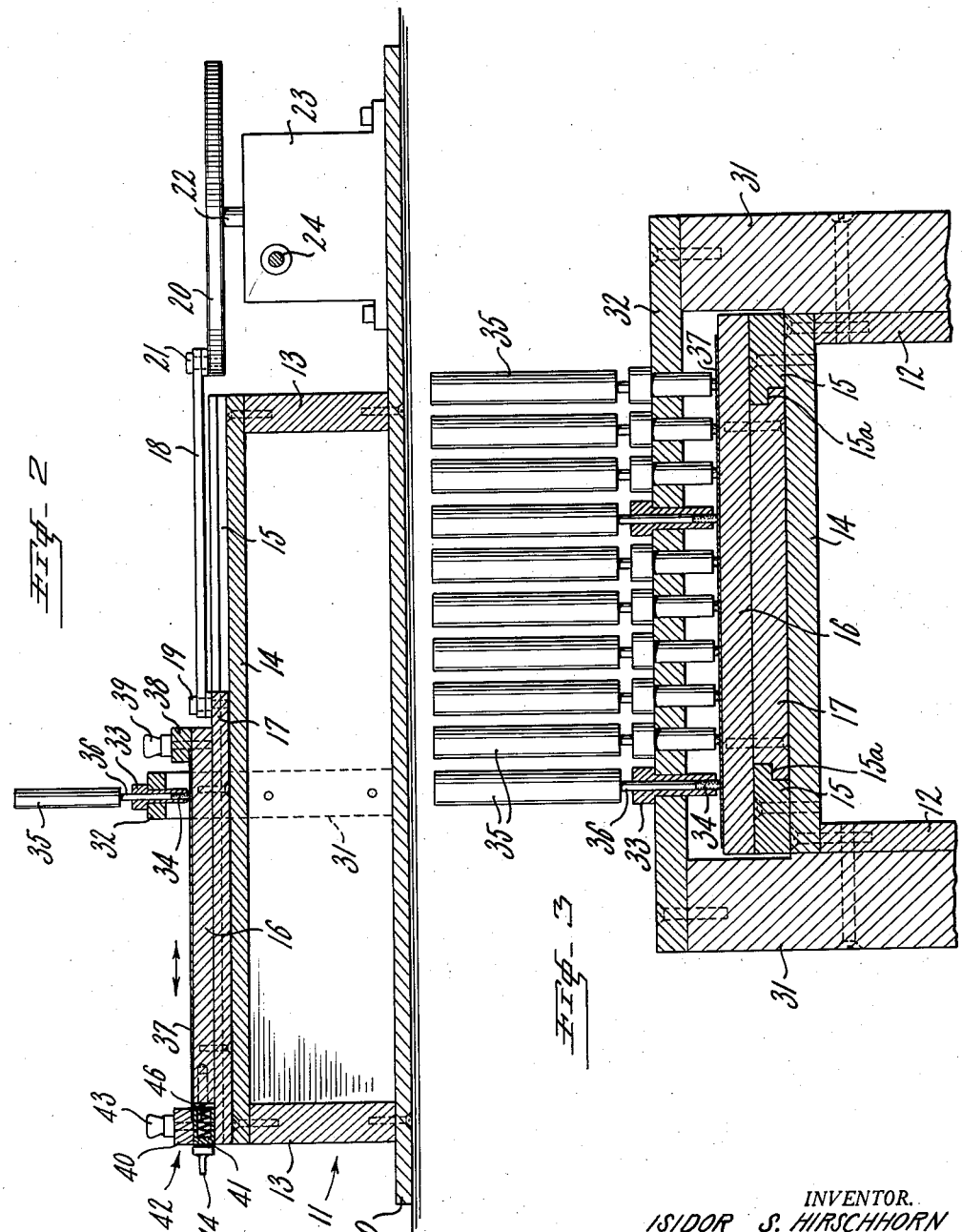

United States Patent Office 2,969,669
Patented Jan. 31, 1961

2,969,669

ABRASION TESTING APPARATUS

Isidor S. Hirschhorn, West Orange, N.J., assignor to Ronson Metals Corporation, Newark, N.J., a corporation of New Jersey Filed May 10, 1955, Ser. No. 507,220

4 Claims. (Cl. 73—7)

The present invention relates to a novel abrasion testing apparatus for determining the relative resistance to abrasion of one or more test specimens. More particularly, the invention relates to an abrasion tester, wherein a number of specimens may be subjected to abrasion under identical conditions so that an exact determination of their relative resistance to abrasion may be made.

Heretofore abrasion testers were known for determining the abrasion resistance of relatively large areas of individual specimens or samples, such as sheet material, fabrics, and the like. These test determinations are, however, only approximate and comparisons between successive tests cannot be made with accuracy. Moreover, the apparatuses are not suited for the testing of materials having relatively small contact or effective areas, such as narrow cylindrical rods, e.g., pyrophoric flints, balls, bar-like pieces, etc.

It is accordingly an object of the present invention to provide means facilitating testing of abrasion resistance of a specimen with a relatively reduced or small contact area in regard to a standard abrading surface.

It is a further object of the present invention to provide means conducive to accurate comparison of a plurality of specimens simultaneously with respect to their abrasion resistance in a single testing apparatus and during uninterrupted operation of same.

Another object of the invention is to provide means redounding to the simultaneous testing of the abrasion resistance of a plurality of rod-shaped specimens, which are securely maintained in predetermined positions relative to a standard abrading surface which is common to all of said specimens.

Still another object of the invention is to provide means ensuring carefully controlled abrasion of a plurality of rod-like specimens with relatively small exposed areas under highly desirable and uniform conditions so that the abrasion resistances of several specimens may be readily and accurately compared to a standard specimen in one and the same testing operation.

A further object of the present invention is to provide means affording easy comparison between two successive abrasion test operations of a plurality of one and the same kind of specimens while the same are subjected to two different portions of a substantially uniformly composed abrading surface, thereby enabling ready evaluation of said specimens as to the quality of abrasion thereof and to the homogeneity of composition of substance throughout the respective specimen lengths.

These and other objects and advantages will become apparent from the following detailed description of the invention, taken in conjunction with the accompanying drawings, wherein:

Fig. 1 is a top plan view of an abrasion testing apparatus made in accordance with the present invention, apparatus portions being broken away to show some of the underlying structure in section;

Fig. 2 is a sectional view of the apparatus taken along line 2—2 of Fig. 1; and

Fig. 3 is an enlarged sectional view of the apparatus taken along line 3—3 of Fig. 1.

Referring now more particularly to the drawings, there is shown in Fig. 2 a base 10 adapted to rest upon a floor or work table. To the base 10 a frame 11 is secured, the frame including lateral supports 12 and end supports 13 carrying a table 14. As can be seen more clearly in Fig. 3, at either side of table 14 a pair of undercut guide plates 15 are provided to form profiled passageways or keyways.

A slide 16 rests on the table 14 between the lateral supports 12 and is attached to member 17 conforming in contour to the passageway defined by undercut guide plates 15. In this manner, the slide 16 together with member 17 are free to move longitudinally of the frame while guided in said keyways 15a.

Referring now to Fig. 2, it can be seen that the member 17 projects longitudinally beyond the slide 16 both to the left and to the right. The right-hand projecting portion of the member 17 is connected with a link bar 18 by means of a pivot post 19, whereby said link bar may pivot freely relative to the member 17 about post 19. The other end of the link bar 18 is similarly connected to a turntable 20 by another pivot post 21. Because this link 18 is connected eccentrically to the turntable 20, as the latter rotates as shown by the arrow in Fig. 1 the member 17 and the slide 16 are reciprocated in longitudinal direction of the table and frame.

To rotate the turntable 20, a shaft 22 is connected with the turntable and enters a gear box 23 from whence it is driven by the rotating shaft 24 of motor 25. A counter 26 is disposed alongside motor 25, the motor and the counter resting on the base 10, and pulleys 27 and 28 serve to connect the motor shaft 24 with the counter shaft 29 by means of belt 30, so that as the turntable is driven the counter 26 registers the number of revolutions of the turntable which is equivalent to measuring the number of reciprocations of the slide 16.

A pair of uprights 31 are supported on base 10 and project upwardly some distance above the surface of the slide 16. A rack or bridge 32 interconnects uprights 31 and is provided with a plurality of spaced apertures. Into each aperture a tubular guide 33 is inserted, the guides 33 having an enlarged head to maintain the lower ends of the guides above the surface of the slide 16.

As shown in Figs. 2 and 3, specimens 34, such as flint rods for cigarette lighters, are fitted into the tubular guides 33 and permitted to rest freely on the underlying surface, while retained laterally by the guides. To this end, preferably the guides extend vertically as shown. To increase the force with which each specimen rests on the underlying surface, there is provided a weight 35 having a lower end 36 of smaller cross-section than that of the hollow of the tubular guides 33. In this manner the weighted rods 35, 36 transmit all of their weight to the specimens 34 supported within the guides.

To test the abrasive resistance of the specimens 34, it is necessary that a sheet of material having an abrasive surface 37 be provided on the slide 16 so that, as the slide is reciprocated the specimens will be abraded thereby.

The abrading surface 37 is held on the support forming slide 16 and member 17 as shown in Figs. 1 and 2. Specifically, at the right-hand end of the slide 16 a bar 38 is removably secured by means of wing nuts 39 so that one end of the abrasive sheet 37 is thereby clamped between the slide 16 and the bar 38.

The left-hand end of the sheet 37 is retained between upper member 40 and lower member 41 of a two-part bar 42 by means of wing nuts 43. Wing nuts 44 serve to secure the lower member 41 to the side of the slide 16, the bottom of member 41 resting on the projecting portion of member 17. The lower member 41 is provided with several recesses 45 in which coiled springs 46 are disposed, the springs bearing against the adjacent side of the slide 16 and thus tensioning the abrasive sheet 37 which is held between bars 38 and 42.

As shown in Fig. 1, the sides of the slide 16 are provided with linear graduations 47 so that the position of the sheet 37 may be readily adjusted and changed with respect to the slide.

The operation of the abrasion testing apparatus is as follows: An abrasive sheet 37 of standard and uniform abrasiveness, such as a sheet of sandpaper or emery cloth is clamped above the slide 16 by means of the bars 38 and 42. Specimens 34 such as cigarette lighter flints are then dropped into the tubular guides 33 and known weights 35 are applied to the upper ends of the flints so that they rest on the abrasive surface 37 under known force. The motor 25 is thereafter actuated and the slide 16 is reciprocated together with the sheet 37 past the stationary flints 34. The counter 26 determines the number of reciprocations of the slide 16.

After a predetermined number of reciprocations, the motor is de-energized. By lifting up the tubular guides 33 to thereby free the specimens, these latter may be measured to compare their resistance to abrasion.

The test will cause a plurality of first tracks to be formed on the abrasive sheet. To repeat the tests over these same track portions would not give truly comparable results and one possible alternative is to discard the abrasive sheet and to employ a fresh sheet for a subsequent test run.

In the interests of economy, however, the graduations 47 permit the abrasive sheet to be displaced a predetermined amount laterally. In this manner during a subsequent test run the guides will be disposed over different and fresh longitudinal tracks or zones of the abrading surface so that further test runs may be made on the same abrasive sheet along second tracks with the same accuracy. This permits a side by side comparison to be made of many specimens and avoids the possibility of error which might otherwise arise through use of a second abrasive sheet having different abrasive characteristics from the first sheet.

The apparatus is especially suited for the testing of the resistance to abrasion of specimens having a small contact area with the abrasive surface, such as rods or tubes of glass, plastic, etc., or small spherical members, such as bearing balls, beads, etc.

The inner diameter of the tubular guides 33 corresponds preferably to the diameter of the test specimens so that the latter are not free to move or cant within the guides due to reciprocation of the abrasive surface. A difference of the order of magnitude of 0.00001 inch is preferred for this purpose.

The weights may also be varied to test the abrasive resistance under different forces and possibly the weights during a single run may be varied so that a comparison may be made of the effect of the force with absolute certainty that all other conditions are maintained identical.

The spacing of the tubular guides from the surface of the abrasive sheet may be adjusted in any known manner and will depend upon the length of the test specimens.

Experiments have shown surprisingly good and uniform results, if a single abrasive paper roll (emanating from a single production run) was used for the aforesaid tests; such paper being, for example, of 150–C grain size (Speed-Wet "Durite").

It is to be noted that the holders for the test specimens may be of various cross-sections (rectangular, hexagonal, elliptical and the like) to accommodate correspondingly shaped bodies of relatively small surface areas.

Various other changes and modifications may be made without departing from the spirit and scope of the present invention and it is intended that such obvious changes and modifications be embraced by the annexed claims.

Having thus described the invention, what is claimed as new and desired to be secured by Letters Patent is:

1. An abrasion testing apparatus comprising an elongated support, a sheet provided with an abrading surface disposed on said support, a plurality of hollow guide means arranged above and in transverse direction of said sheet, means for reciprocating said support in longitudinal direction of said support and relative to said guide means, said guide means being adapted to receive and hold a plurality of test specimens, means applying uniform force to the specimens when received in said guide means, so that upon reciprocation of said support all of said specimens are simultaneously and under uniform condition subjected to abrasion by said abrading sheet surface, graduated means on said support for adjusting the disposition of said abrading sheet in transverse direction of the latter, said guide means being spaced from each other whereby upon adjusting the position of said sheet said specimens may be subjected to abrasion by different portions of the abrading sheet surface to thereby utilize successively all of said surface, means for tensioning said sheet surface in longitudinal direction on said support, and means for releasably clamping said sheet surface to said support.

2. An abrasion testing apparatus comprising a frame, an elongated support positioned for movement on said frame, means for releasably clamping to said support a sheet having an abrading surface, bridge means carried by said frame and extending transversely of said support and located spaced from and above the latter, a plurality of hollow spaced specimen guides carried by said bridge means, means applying uniform force to the specimens when received in said guide means, drive means for reciprocating said support in longitudinal direction thereof and relative to said guides, whereby upon clamping said sheet with its abrading surface by said clamping means to said support and disposing a plurality of specimens in said hollow guides, respectively, reciprocation of said support causes by said drive means said specimens to be simultaneously abraded along a plurality of first spaced tracks defined on said sheet surface, and graduated means provided on said support, whereby following a first test run said abrading sheet surface may be released by said clamping means and shifted in transverse direction of the length of said sheet and for predetermined alignment with one of said graduated means to achieve a further test run to be made on said abrading sheet surface and in proximity of the first tracks thereby attaining second spaced tracks on said abrading sheet surface during further reciprocation of said support.

3. A testing apparatus according to claim 2, said clamping means including a pair of longitudinally spaced bars disposed at opposite ends of said support, means for releasably securing said bars to said support, and spring means urging at least one of said bars away from said support, whereby said abrading sheet surface when held on said support by said bars is tensioned by said spring means.

4. An abrasion testing apparatus including a frame, a support carried by said frame for longitudinal displacement relative to the latter, link means pivotally connected with said support, turntable means pivotally and eccentrically connected with said link means, whereby rotation of said turntable means causes longitudinal reciprocation of said support relative to said frame, a pair of bars disposed at opposite ends of said support, means for releasably clamping said bars to said support, whereby a sheet with an abrading surface may be clamped between said bars to overlie said support, spring means urging at least one of said bars away from said support, to thereby tension said sheet in lengthwise direction thereof when the sheet is clamped between said bars, rack means carried by said frame and extending transversely of said support and spaced above said support, a plurality of spaced tubular specimen guides carried by said rack means and extending substantially perpendicular to and across said support, a plurality of weighted members having reduced lower ends conforming approximately to said guides, whereby said weighted members exert a predetermined force on specimens when disposed within said guides and resting on said abrading surface of said sheet, reciprocation of said support together with said sheet abrading surface causing simultaneous abrasion of all of said specimens, and graduated means for facilitating displacement of said sheet transversely of said support and subdividing said support longitudinally, whereby following a first test run said sheet with its abrading surface may be shifted from a first position laterally of said support and placed against corresponding predetermined graduated means in a second position so that during a subsequent test run said guides will be disposed over respective longitudinal zones of said abrading surface different from the zones of the latter exposed during said first run for comparison purposes.

References Cited in the file of this patent

UNITED STATES PATENTS

| | | |
|---|---|---|
| 895,980 | Derihon | Aug. 11, 1908 |
| 1,344,301 | Jury | June 22, 1920 |
| 1,581,215 | Kobin | Apr. 20, 1926 |
| 1,899,774 | Rothchild et al. | Feb. 28, 1933 |
| 2,032,202 | Dennis | Feb. 25, 1936 |
| 2,708,328 | Bryda | May 17, 1955 |
| 2,822,686 | Campana | Feb. 11, 1958 |